Figure 3:
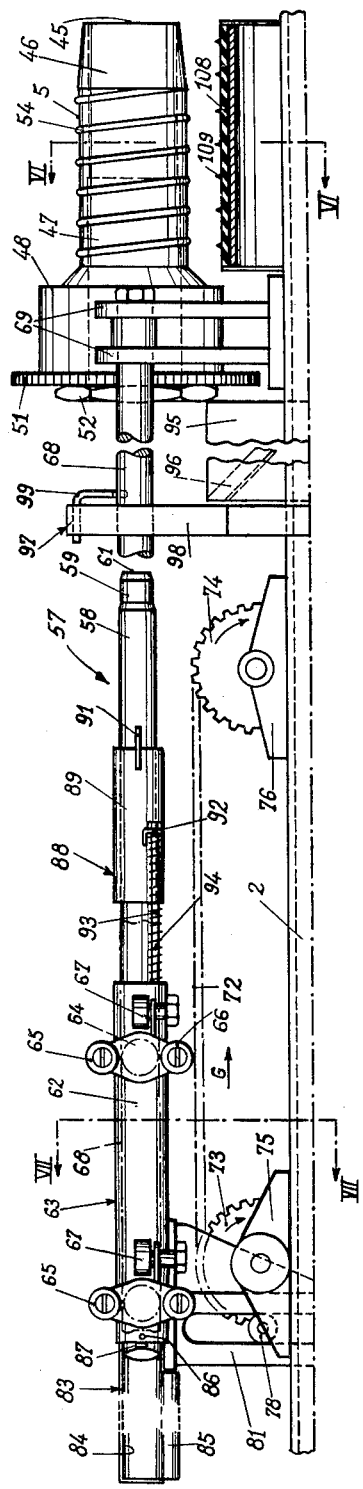

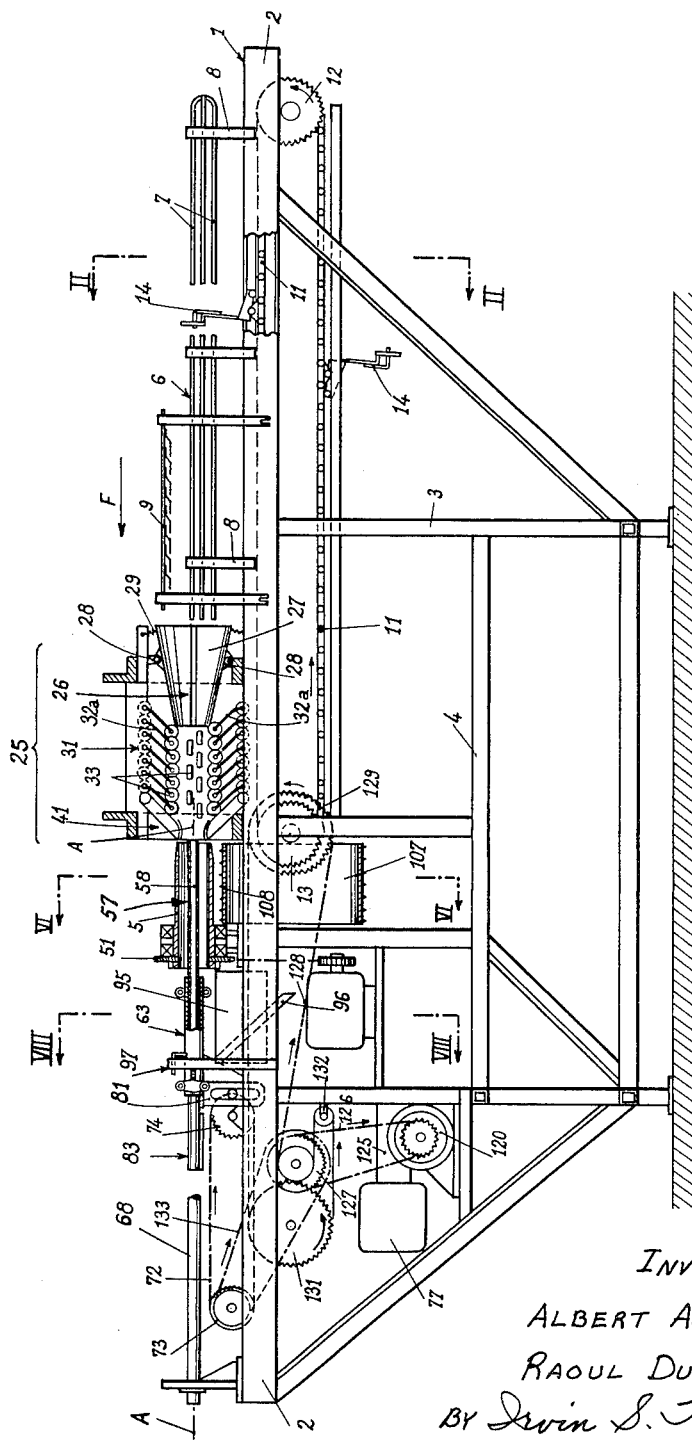

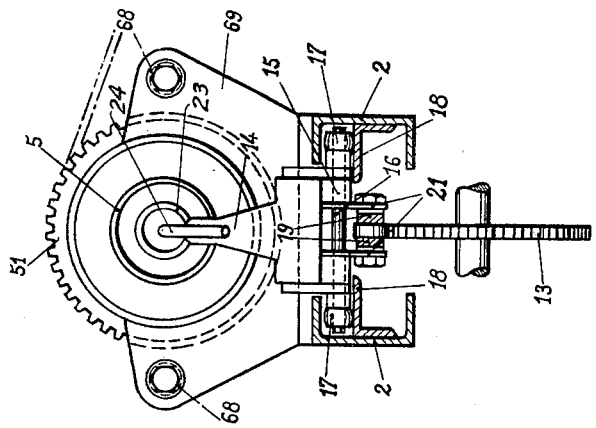
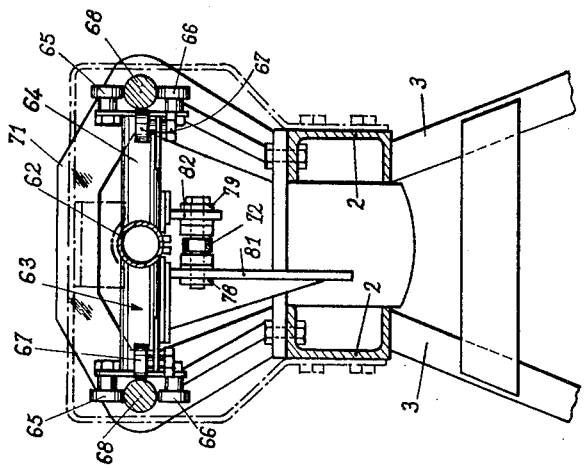
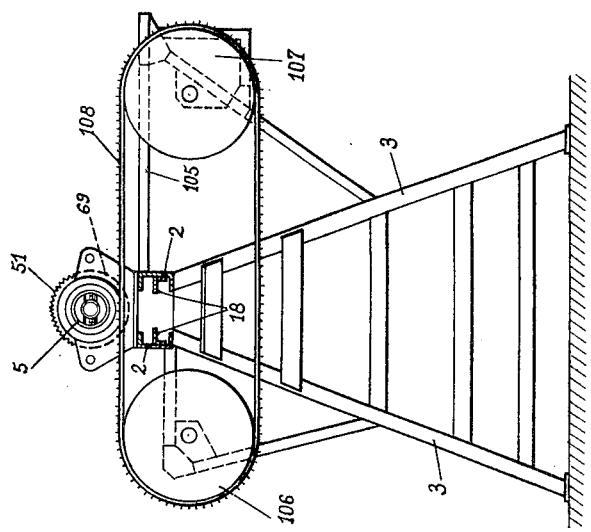

INVENTORS:
ALBERT AUBERY AND
RAOUL DULIEU
By Irvin S. Thompson
ATTORNEY

INVENTORS:
ALBERT AUBERY AND
RAOUL DULIEU
BY Irvin S. Thompson
ATTORNEY

Feb. 1, 1966

A. AUBERY ETAL 3,232,328

MACHINE FOR PROCESSING PINEAPPLE

Filed Oct. 7, 1963

7 Sheets-Sheet 5

INVENTORS:
ALBERT AUBERY AND
RAOUL DULIEU
BY Irvin S. Thompson
ATTORNEY

Feb. 1, 1966    A. AUBERY ETAL    3,232,328
MACHINE FOR PROCESSING PINEAPPLE
Filed Oct. 7, 1963    7 Sheets-Sheet 6

INVENTORS:
ALBERT AUBERY AND
RAOUL DULIEU
By Irvin S. Thompson
ATTORNEY

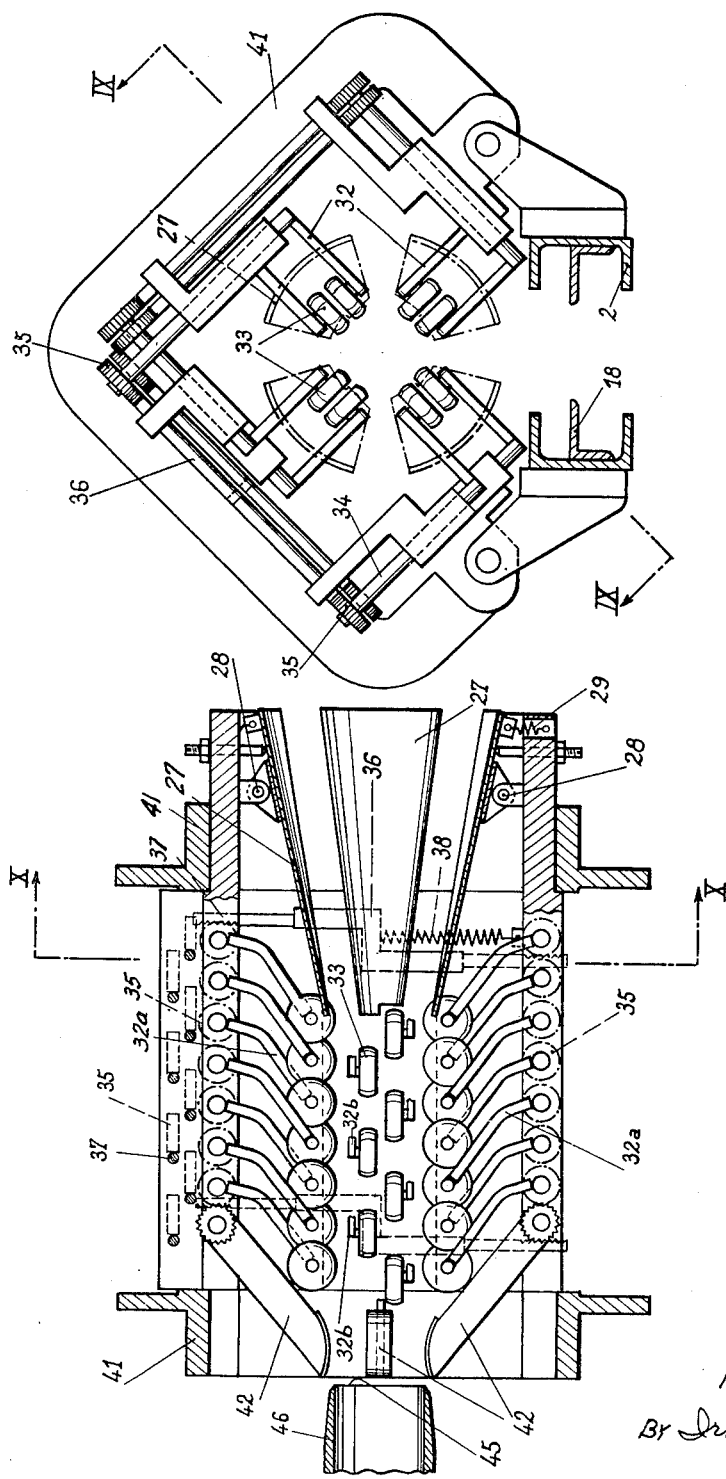

United States Patent Office 3,232,328
Patented Feb. 1, 1966

3,232,328
MACHINE FOR PROCESSING PINEAPPLE
Albert Aubery, Blvd. Amiral de Gueydan, Fort de France, Martinique, and Raoul Dulieu, La Giraude Givry, France
Filed Oct. 7, 1963, Ser. No. 314,359
Claims priority, application France, Oct. 19, 1962, 912,773, Patent 1,351,428
9 Claims. (Cl. 146—6)

The present invention relates to a machine for the processing of fruit, especially fruit of the pineapple variety, for the purpose of preserving in cans or tins.

It is known that the cans of pineapple which are commercially available at the present time contain pineapple fruits which are cut into discs of uniform size. These discs are obtained after a succession of cutting operations performed on the fruits. To be more precise, it is necessary to trim each fruit in the shape of a cylinder of standardized dimensions, thereby eliminating the shell. This operation is generally known as "sizing."

The woody core which is unfit for consumption is usually removed by forming along the axis of the fruit a cylindrical cut (operation known as "coring"). There is thus obtained a tubular "sleeve," the two ends of which are cut off to remove that portion of the shell remaining thereon. The sleeve thus obtained which is sized on all faces is then cut into slices at right angles to its axis, thus producing discs which are then packed in cans.

Machines designed to carry out all or a part of the cutting operations which have just been mentioned have existed for a long time. The machines which are at present in use are of complicated design since they comprise mechanical devices which are electrically driven as well as compressed-air units which are mainly intended for the purpose of conveying the fruit from one station to another or for the purpose of actuating certain components.

Under these conditions, the machines now on sale are costly to manufacture, while any repairs to be undertaken in the event of breakdown require the services of a qualified technician, which can cause serious difficulties, especially when such machines are employed in tropical countries.

The machine which is contemplated by the present invention has for its object to overcome the above-mentioned disadvantages. The machine is in fact of simple and sturdy construction inasmuch as it consists only of mechanical parts which are driven from a main motor and does not make use of any compressed-air system. The cost price of this machine is accordingly reduced. At the same time, a machine of this design is capable of working at a high production speed, thereby permitting it to compete with machines which have a much more complex construction design.

It is known in pineapple processing machinery to arrange on a horizontal bench a guide rack in which the pineapple fruits progress and are pushed forward by means of retractable fingers mounted on an endless chain. At the downstream portion of the conveyor is fixed a centering head which is intended to facilitate the presentation of the fruits to the external sizing device which is in turn assigned to the task of cutting the major part of the shell and converting the body of each individual fruit into a cylinder.

It is also known to construct the sizing unit by making use of a rotary sleeve with cutting edges into which the fruit is driven by the action of the push-plates of the conveyor. During this introduction operation, the shell is separated from the body. Provision has also been made for the arrangement of a stationary cutting-blade which is mounted parallel to the wall of the sizing unit and along a generator-line of this latter. The said cutting-blade splits the shell of the fruit and the shell is then removed by carrying devices. The pulp which remains on the internal face of the shell can be recovered by scraping devices.

In machines of this type, the sized fruit is then sent into a rotary drum system in which are performed the operations involving cutting of the ends and coring.

The object of the machine which is contemplated by the present invention is to carry out under particularly advantageous conditions the sizing and coring of fruits, following which it is possible by any known means to carry out the cutting of the tubular elements obtained.

According to the present invention, a machine is provided for sizing and coring pineapples and similar fruits, comprising a frame, a tubular sizing cutter rotatably mounted on the frame, a movable feeding device for said sizing cutter, said device comprising means to push said fruits towards said sizing cutter, a nonrotating tubular coring cutter movably mounted along said frame, coaxially to said sizing cutter and adapted to penetrate into said latter cutter, means fitted on said coring cutter to keep the fruit from turning by engagement therewith while being sized, said latter means comprising a fruit pricker slidably mounted onto said coring tubular cutter, means to rotate said sizing cutter, driving means to reciprocate said coring cutter with respect to said sizing cutter, and means to synchronize the motion of said coring cutter with that of said means to push said fruits towards said sizing cutter so that each of said fruits is penetrated by said coring cutter while being pushed in the opposite direction onto said sizing cutter by said pushing means.

As a preferable feature, the coring cutter is mounted on a moving trolley in guide rails carried on the frame of the machine at the end opposite to the rotary sizing cutter relatively to the feed device, means being additionally provided with a view to synchronizing the movements in opposite directions of the coring cutter and retractable fingers which push forward the individual pineapple fruits.

A stop is preferably provided at the outlet of the coring cutter. The function of said stop is to extract the useful portion of the fruit as and when this latter passes out of the sizing cutter, thus permitting said useful portion to pass on to the subsequent cutting apparatus.

In a preferred form of embodiment of the invention, a device is incorporated with the machine hereinabove described for the purpose of opening out the shell of the fruit and recovering the pulp which remains attached thereto.

Further characteristic features of the invention will be brought out by the description which follows below.

Figure 4:
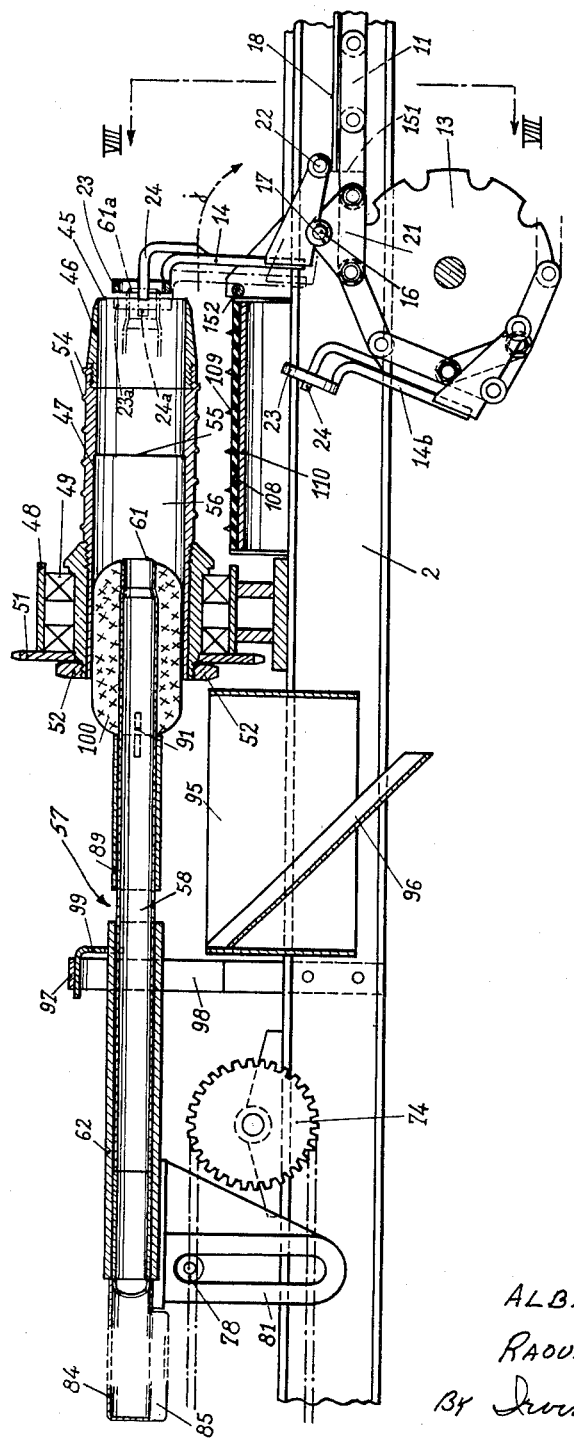
Figure 5:
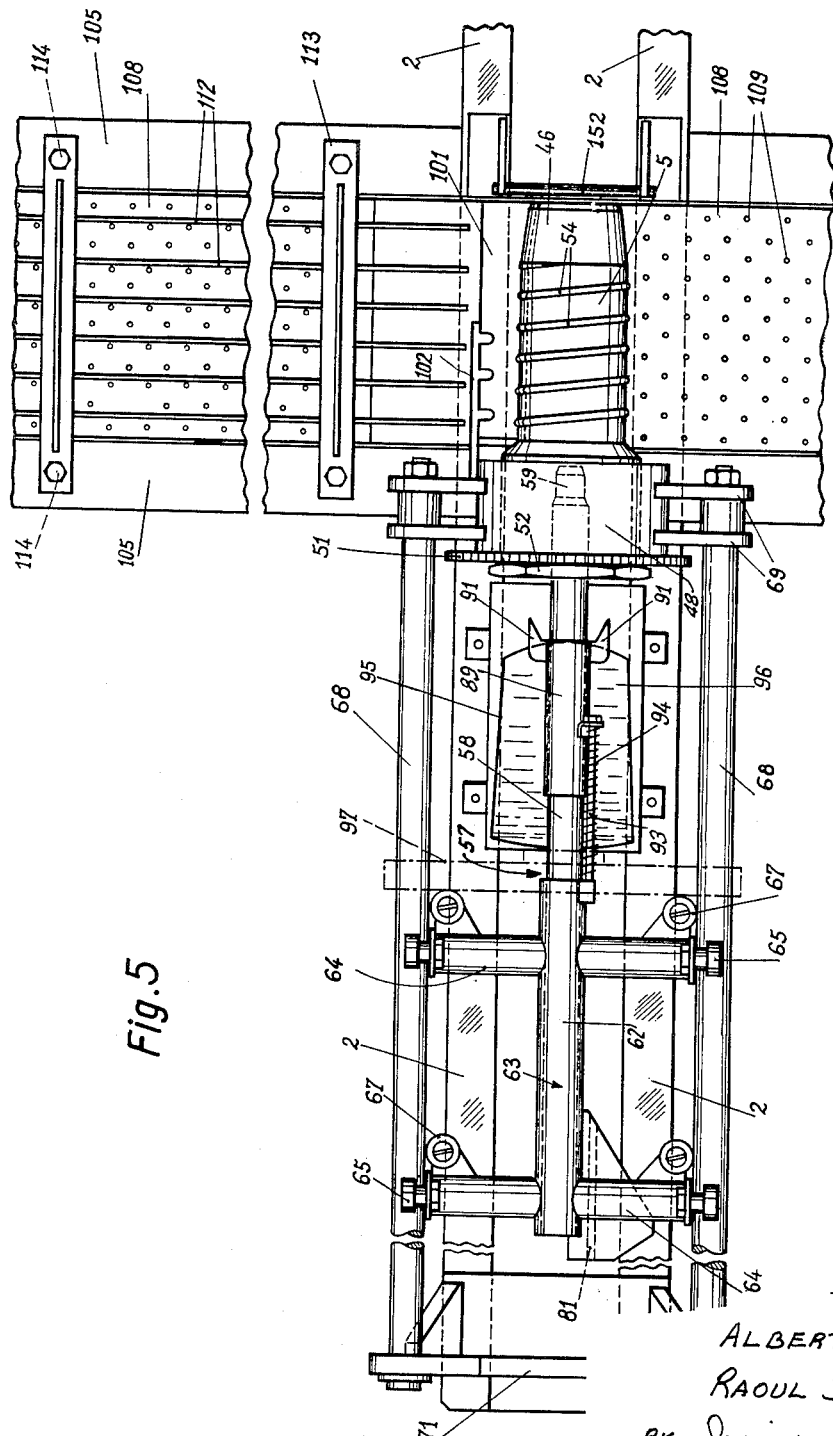
Figure 6:
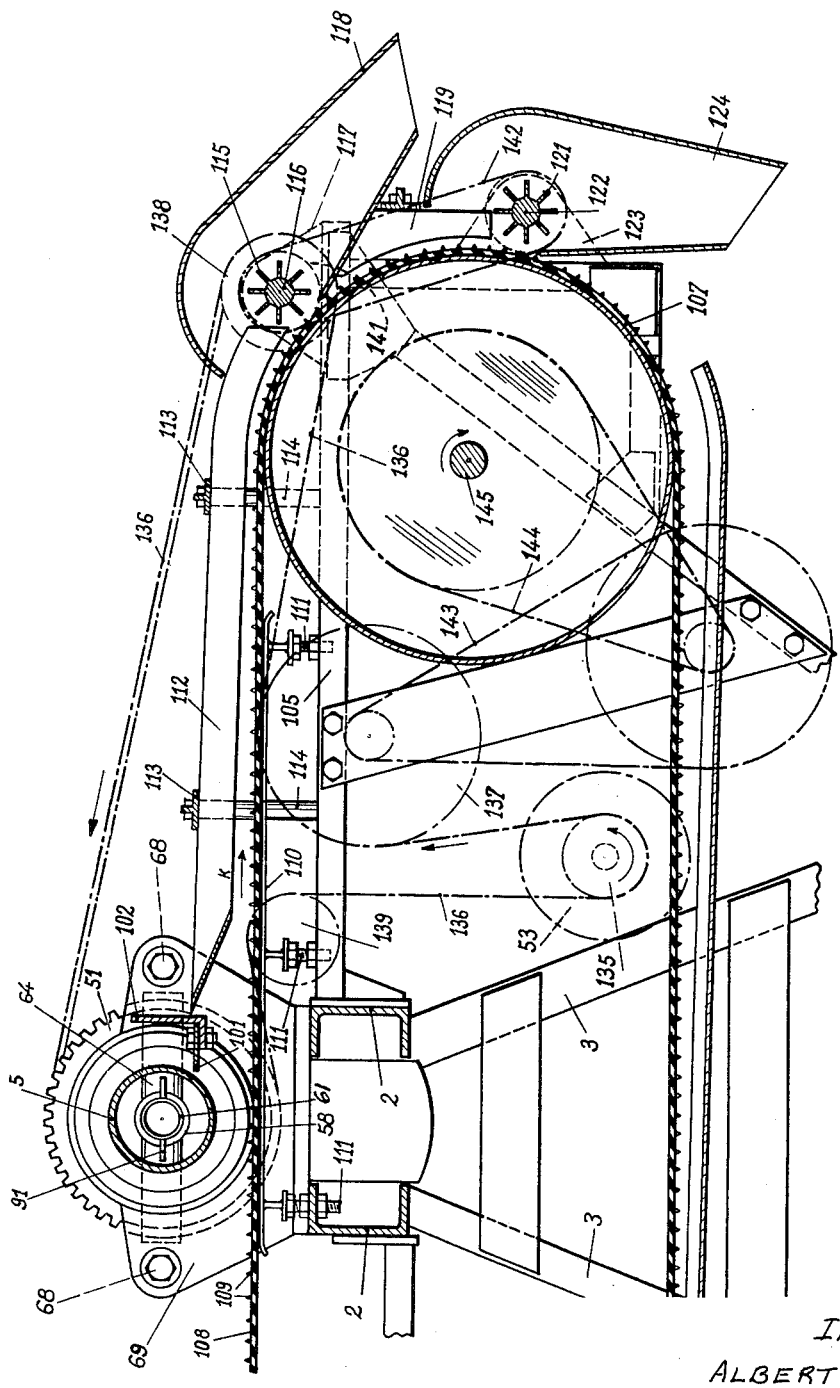

In the accompanying drawings which are given by way of non-limitative example,

FIG. 1 is a view in side elevation on a small scale of a machine for sizing and coring pineapple fruits, FIG. 2 is the corresponding diagrammatic view looking on the end and after a cross-section has been taken along the line II—II of FIG. 1, the feed device having been removed, FIG. 3 is a partial side view of the machine taken in elevation on a larger scale and showing the sizing cutter and coring cutter at a distance away from each other, FIG. 4 is a view on the same scale as FIG. 3, taken in cross-section along a diametral plane, showing the coring cutter during operation, as it is passing out of the sizing cutter, FIG. 5 is a plan view corresponding to FIG. 4, FIG. 6 is a view taken in transverse cross-section along the line VI—VI of FIG. 3, FIG. 7 is a view in transverse cross-section taken along the line VII—VII of FIG. 3, FIG. 8 is another transverse sectional view taken along the line VIII—VIII of FIG. 1 and on the same scale as FIG. 7, FIG. 9 is a view in longitudinal cross-section on a larger scale along the line IX—IX of FIG. 10 and showing the centering head.

FIG. 10 is the corresponding transverse cross-section taken along the line X—X of FIG. 9.

Reference being made to FIGS. 1 and 2, it can be seen that the machine which is provided by the invention essentially comprises a bench 1 constituted by two parallel side-stringers 2 which are joined together and are supported on oblique legs 3, said frame being strengthened by means of cross-members 4.

There is mounted on the bench 1 the combined assembly of devices which serve to carry out the sizing and coring of pineapple fruits.

The direction considered as being the direction F of forward progression of the fruits, provision is made on the upstream portion of the bench 1 for a feed system which is intended to bring the fruits toward the rotary sizing cutter 5 which is substantially located at the centre of the bench 1. The said feed system comprises in the form of embodiment described a guide rack 6 having the shape of a cradle and constituted by assembled rods 7 carried on upright members 8.

In the downstream portion thereof, the guide rack 6 is surmounted by a spring-mounted plate 9 which holds the fruits applied against the guide rack during their forward progression in order to prevent these latter from rolling off.

Beneath the guide rack 6 and between the two side-stringers 2, there is provided an endless chain 11 such as a link-chain which is mounted between sprockets 12 and 13 and fitted with push-plate units 14 (as shown in FIGS. 4 and 8). Each push-plate unit 14 comprises a yoke 15 through which passes a shaft 16 fitted with rollers 17 which are adapted to run along angle-iron members 18 arranged inside the side-stringers 2. The shaft 16 is also used for the purpose of providing a coupling between the push-plate unit 14 and the drive chain 11 through the intermediary of triangles 21 which are secured to said chain and through which passes the shaft 16. The body of the push-plate unit 14 carries a second shaft which is parallel to the shaft 16 and fitted with rollers 22, so that if the rollers 17 and 22 are applied against the angle-iron members 18, the push-plate unit 14 has a constant and substantially vertical orientation and moves in a direction parallel to its axis when the chain 11 is driven. This driven movement is carried out from the terminal sprocket 13, while the other sprocket 12 serves to guide the chain. Each push-plate unit 14 is provided at the end thereof with a ring 23 through which is passed axially a finger 24, these members being intended to be brought to bear in the active position thereof against the base of a pineapple.

The guide rack 6 terminates in a centering device 25 (FIG. 1) which is located at the forward end of the cutter 5.

Said centering device consists of three consecutive parts (as shown in FIG. 9 and FIG. 10):

(1) An inserter 26 constituted by independent troughs 27 which are pivoted about fulcrum-pins 28 and returned by springs 29, the combined assembly constituting a frusto-conical surface providing a variable opening.

(2) A centering unit 31 constituted by four rows of pair of fingers 32a, 32b, said four rows being arranged in a cross with the fingers disposed in inclined planes at an angle of 45° with respect to the horizontal. The said fingers 32 terminate in rollers 33 which are arranged in oppositely facing relation so as to form an axial passageway for the pineapple. The fingers 32 are pivoted about orthogonal shafts 34 terminating in pinions 35. The pinions 35 which form part of two diametrically opposite fingers are coupled together by means of a same elbowed rod 36 provided with two racks 37 oppositely directed in such manner that if one of the fingers 32 moves away from the axis, the diametrically opposite finger moves away through an equal angle. When at rest, the fingers 32 are held in that position which is nearest to the axis A—A of the sizing cutter 5 by restoring springs 38 which are each attached to one of the elbowed rods 36. The function of the centering device 31 is to align the axis of the fruit with the axis A—A (as shown in FIG. 4) of the sizing cutter 5.

(3) A presenting unit 41 comprising four pivoting shoes 42 which are mounted in diametrically opposite pairs as in the case of the above-mentioned fingers 32. The shoes 42 are arranged in immediate proximity to the leading cutting edge 45 of the rotary cutter 5. The presenting unit 41 is intended to maintain constant the orientation of the fruit during the entire period of insertion thereof through the sizing cutter.

The centering device 25 is additionally arranged so as to permit the forward motion of the push-plate units 14 within the head, this possibility being ensured by the angular position of the head as can be seen in FIG. 9.

The sizing cutter 5 is constituted as shown in FIG. 4 in a manner which is known per se by a cutting ring 46 of high-strength steel which is screwed into an annular body 47 mounted in a stationary cage 48 by means of roller bearings 49. The body 47 carries a sprocket 51 which is secured by a nut 52. The sprocket 51 enables the cutter 5 to be driven in rotation from an electric motor 53 (as shown in FIG. 6) by means of a chain drive which will be described below.

In accordance with a particular feature of the invention, provision is made on the outer surface of the tubular member 47 for a set of spirally arranged ribs 54. In addition, the member 47 is provided at the downstream end beyond a line 55 with a bore 56 having a diameter which is slightly greater than that of the ring 46. A longitudinal cutting-blade 101 is mounted parallel to the rotary cutter 5 in such manner as to permit of adjustment within a stationary right-angle bracket or angle-iron 102 which is fixed along the tube 47 (as shown in FIGS. 5 and 6). The cutting-blade 101 is intended to split the shells of fruits in a longitudinal direction.

The coring cutter 57 is mounted at the downstream end of the sizing cutter 5. Said coring cutter comprises (see FIGS. 3, 4 and 5) a cylindrical tube 58, the diameter of which corresponds to that of the central portion to be extracted from the pineapple. The axis of the tube 58 coincides in any position with the axis A—A of the sizing cutter 5. The tube 58 is slightly narrowed at the upstream end 59 thereof and terminates in an oblique cutting edge 61.

The tube 58 is detachably mounted inside a tubular sleeve 62 which constitutes the main member of a carriage 63 provided with four arms 64 on each of which are mounted three guide rollers, namely, a top roller 65, a bottom roller 66 and a side roller 67. These rollers serve to guide the carriage 63 along two rails 68 of circular section which are secured at the upstream end to flanges 69 made integral with the cage 48 of the cutter 5 and which are secured at the downstream end to a gantry 71 (as shown in FIG. 7) which is supported on the side-stringers 2.

A reciprocating motion is imparted to the carriage 63 by means of an endless chain 72 which meshes with a driving sprocket 73 and an idler sprocket 74 which are mounted in bearings 75, 76 carried on the bench 1. The sprocket 73 is driven from a motor 77 (as shown in FIG. 1) by means of a chain drive which will be described below. For the purpose of driving the carriage 63, the chain 72 is fitted with rollers 78, 79 (as shown in FIG. 7), the roller 78 being held inside a guide plate 81 which is fixed beneath the carriage, the roller 79 being engaged in a bracket 82 during the active travel in the direction G which is opposite to F.

In the downstream portion of the sleeve 62 is engaged a tubular ejector 83 which is hollowed out to form an opening 84 which is provided with a discharging flange 85 designed to permit the discharge of the cores which are located inside the tube 58. The passageway between the tube 58 and the ejector 83 can be slightly closed off by a nose 86 which is adjustable by means of a screw 87.

On the tube 58 is mounted a fruit pricker 88 comprising a sliding collar 89 which terminates at the upstream end in two claws 91. The collar 89 is provided with lugs 92 which are adapted to slide along rods 93 which are secured to the sleeve 62. Coil springs 94 fitted over the rods 93 urge the fruit pricker 88 in the upstream direction.

The bench 1 is provided between the sprocket 74 and the flanges 69 with a box 95 containing a chute 96 intended for the discharge of the useful portion of the sized and cored pineapple fruits. At the downstream end of the box 95 is mounted a stop 97 for the purpose of extracting fruits which have been processed. Said stop is constituted by a gantry 98 which is fixed on the side-stringers 2 and which rests on rails 68. The gantry 98 is fitted with a top nose 99 which follows the shape of the sleeve 62.

The system described above is so designed that, in the position of withdrawal of the carriage 63, the cutting edge 61 of the tube 58 moves to a point downstream of the stop 97 (as shown in FIG. 3) whereas in the position of maximum forward travel in the direction G, the front edge reaches the point 61a (as shown in FIG. 4) which is located slightly in front of the edge 45 of the cutter 5.

The machine additionally comprises a mechanism for carrying away the cut shell and for scraping this latter. This mechanism is mounted (as shown in FIGS. 2 and 6) on an asymmetric cradle 105 located at right angles to the bench 1 and which carries two drums 106, 107 between which is stretched a rubberized belt 108 studded with rows of spikes 109. The spiked belt 108 is orthogonal to the cutter 5 and passes beneath this latter in the direction K at a distance which corresponds to the mean thickness of the shells of the fruits. The top run of the belt 108 is guided by a plate 110 which is mounted at an adjustable height on the cradle 105 and the bench 1 by means of screws 111.

There is located above the belt 108 a wall of open-work structure constituted by parallel strips 112 which are rigidly secured by cross-strips 113 held by small columns 114.

The front ends of the strips 112 bear on the blade-carrying angle-iron 102. The bottom edges of the strips 112 move progressively nearer to the belt 108 and follow the shape of this latter.

The strips 112 are interrupted so as to accommodate a rotary scraper 115 fitted with blades and mounted on a shaft 116 carried in bearings 117. The rotary scraper 115 is housed in a casing 118 which permits the evacuation of the pulp. Provision is again made on the other side of the scraper-wheel 115 for strips 119 in the line of extension of the strips 112 followed by a second rotary scraper 121 which is mounted on a shaft 122 carried in bearings 123. Said rotary scraper 121 is covered by a casing 124 forming a discharge chute.

The blades of the scraper-wheels 115 and 121 are located at a small distance away from the cylindrical surface which is covered with spikes 109.

The driving mechanism which is contemplated for the machine comprises the motor 77 for the carriage 63 and push-plate units 14 (as shown in FIG. 1), which have to be synchronized in their movements in opposite directions. The motor 77 drives a reducer 125 which is in mesh with a sprocket 120 so as to produce the rotation of a sprocket 127 by means of a chain 126. Said sprocket 127 drives a chain 128 which is mounted between two idler sprockets 129, 131 and a tension sprocket 132. The sprocket 129 actuates the coaxial sprocket 13 of the feed chain 11 which carries the push-plate units 14.

The sprocket 127 also drives a chain 133 which transmits motion to the sprocket 73 for driving the chain 72 which operates the carriage 63.

By way of indication, in a particular form of embodiment, the 2 H.P. motor 77 is designed to impart to the carriage 63 fifty back-and-forth movements per minute, which corresponds to the treatment of 50 fruits per minute.

The motor 55 (rated at 1 H.P., for example) drives a sprocket 135 (as shown in FIG. 6) which meshes with a chain 136, said chain being adapted to pass over a sprocket 137, then over a sprocket 138 which is keyed on the shaft 116 of the rotary scraper 115. From that point, the chain 136 meshes with the sprocket 51 of the rotary cutter 5 and returns to the sprocket 135 after being supported on an idler sprocket 139. The rotary scraper 121 is driven from a second sprocket 141 of the shaft 116 by means of a chain 142.

The forward progression of the belt 108 is also effected from the sprocket 135 by means of two successive chain reducers 143, 144, this latter driving the shaft 145 of the drum 107.

By way of example, the belt 108 is capable of displacement at a speed of 25 metres per minute, the cutter 5 is capable of rotating at 55° revolutions per minute (r.p.m.) and the rotary scrapers 115 and 121 respectively at 1070 and 1130 r.p.m.

The operation of the machine as thus constituted is as follows:

The pineapple fruits, the leaves of which have been cut off, are brought one by one by any suitable means into the guide rack 6 and displaced in the direction F by the push-plate units 14.

The inserter 26 permits the engagement of the pineapple fruits which move with the head end foremost towards the rollers 33 of the centering unit 31. By reason of the coupling of the rollers 33 in pairs by means of the elbowed rods 36 and under the action of the springs 38, the fruits are moved forward in a direction which is co-axial with the line A—A.

As and when each individual pineapple fruit comes into contact with the edge 45 of the rotary cutter 5, a circle is cut in the shell and the fruit cut cylindrically beneath the shell. The shoes 42 of the presenting unit 41 hold the fruit during the insertion through the cutter 5 and help to prevent the fruit from rotating.

While the fruit moves forward in the direction F through the cutter 5, the coring cutter 57 is moved at the same time in the direction G and the leading edge 61 of said coring cutter penetrates into the head of the fruit in the interior of the annular body 47.

Starting from a certain depth of penetration, the claws 91 of the collar 89 prick the pulp of the pineapple inside the body 47 and prevent the fruit from rotating about its own axis in spite of the penetration of this latter inside the rotary cutter 5.

At the same time, the shell of the fruit is split longitudinally by the cutting-blade 101 progressively as the pineapple passes through the body 47 under the action of the push-plate unit 14. The spiral ribs 54 facilitates in turn the forward motion of the fruit. At the same time, the translational motion of the belt 108 in the direction K produces by means of the spikes 109, the opening out of the shell which is carried along beneath the strips 112.

The mechanisms for actuating the coring cutter 57 and push-plate units 14 are so regulated that, if the cutting edge 61 of the tube 58 has reached the end-of-travel position 61a (as shown in FIG. 4) as considered in the direction G, the push-plate unit 14 has moved forward in such manner that the ring 23 and finger 24 are respectively located at 23a and 24a, that is to say slightly engaged inside the cutter 5. At this moment, the rollers 22 of the push-plate unit 14 move off the angle-iron members 18 which terminate at the edges 151 whilst the push-plate unit 14 is brought to bear against a transverse rod 152 which is mounted on the plate 110. Taking account of the displacement of the push-plate unit 14 in the direction F, the obstacle thus constituted by said rod produces the pivotal motion of the said push-plate unit about the shaft 16 and in the direction J. The push-plate unit accordingly reaches the position 14b.

The end positions both of the push-plate units 14 and of the coring cutter 57 are such as to ensure that the shell and the core of the fruit have been completely cut when said positions have been reached. The cutter 57 then commences its movement of withdrawal in the direction F and draws with it the sized fruit 100 which slides within the body 47. This movement of translation is carried out without rotation of the fruit as ensured by the fruit-pricker 88 and the annular enlargement 56 provided in the interior of the cutter 5, said enlargement being designed to facilitate the sliding of the fruit which is also tightly held over the tube 58.

It will be noted that the sliding flexible assembly of the fruit-pricker 88 ensures a correct grip of the fruit irrespective of the length thereof.

As the movement of withdrawal of the carriage 63 continues, the sized fruit is drawn out of the sizing cutter 5 and brought with the coring cutter 57 until the fruit which is thus displaced strikes against the nose 99 of the ejector stop 97. When the cutter 57 has been disengaged, the fruit falls onto the chute 96 of the box 95 and can in particular be directed from said chute to devices of any type for cutting-off the ends.

The pineapple core has remained inside the cylindrical tube 58. Progressively as the successive fruits are processed, these cores thrust each other back and accordingly move towards the ejector window 84. The cores are prevented from falling at any moment by the stop 86 and are accordingly braked in their movement of discharge so as to be tipped into an evacuating device which has not been illustrated in the drawings, in respect of a position of the carriage which always remains the same.

At the same time, the shells which are opened out are applied progressively by the strips 112 against the belt 108 and, at the moment of passing of said shells beneath the blades of the rotary scrapers 115 and 121, the pulp remaining on the shell is scraped off and directed by the casings 118 and 124 towards recovery tanks which have not been illustrated in the drawings.

In order to change the production speed of the machine, it is merely necessary either to produce action on the speed of the motor 77 or to change the diameter of the sprocket 120.

What we claim is:

1. Machine for sizing and coring pineapples and similar fruits, said machine comprising a frame, a tubular sizing cutter rotatably mounted on said frame, a movable feeding device for said sizing cutter, said device comprising means to push said fruits towards said sizing cutter, a non-rotating tubular coring cutter movably mounted along said frame coaxially to said sizing cutter and adapted to penetrate into said latter cutter, means fitted on said coring cutter to keep the fruit from turning by engagement therewith while being sized, said latter means comprising a fruit pricker slidably mounted onto said coring tubular cutter, means to rotate said sizing cutter, driving means to reciprocate said coring cutter with respect to said sizing cutter, and means to synchronize the motion of said coring cutter with that of said means to push said fruits towards said sizing cutter so that each of said fruits is penetrated by said coring cutter while being pushed in the opposite direction onto said sizing cutter by said pushing means.

2. Machine according to claim 1 and comprising guide rails carried by said frame at the end opposite to said feeding device with respect to said rotating sizing cutter, and wherein said movable coring cutter comprises a trolley movably mounted onto said guide rails and a coring tube parallel to said rails fitted on said trolley.

3. Machine according to claim 1 wherein said tubular coring cutter comprises a cutting orifice at the one end thereof and means to discharge the cut cores, said discharging means comprising a window provided within said tubular cutter at the other end thereof.

4. Machine according to claim 1 wherein said coring cutter comprises a trolley movably mounted along rails fitted on said frame, said trolley bearing a flange rigidly fitted thereon, and wherein said reciprocating driving means comprise an endless chain movably mounted along said rails, said chain carrying a roller in sliding engagement with said trolley flange, and wherein said synchronizing means comprise a common driving system for said endless chain and for said fruit feeding device.

5. Machine according to claim 1 and comprising means to split the shell of the fruit progressively as the same is inserted onto said tubular sizing cutter, said splitting means consisting of a stationary cutting blade placed alongside said sizing cutter, said machine further comprising a movable endless spiked belt disposed beneath said sizing cutter, parallelly to the axis thereof, and means to drive along said belt in a direction transverse to said cutter axis.

6. Machine according to claim 1 and comprising means to split the shell of the fruit progressively as the same is inserted onto said tubular sizing cutter, means to open out and carry away the shell of the fruit, said opening-out and carrying means comprising an endless spiked belt disposed beneath said sizing rotary cutter, means for the recovery of the pulp remaining on said shell, said recovering means comprising pressing devices disposed above said endless belt for pressing said shell thereon and rotating scraper wheels fitted between said pressing devices, driving means for said sizing cutter, chain conveying belt and scraper wheels, said driving means comprising one electric motor and gearing means energized by said motor.

7. Machine according to claim 1 wherein said sizing tubular cutter comprises a cutting end and a fruit discharge end having inner cylindrical surfaces, said discharge end having a larger inner diameter than said cutting end.

8. Machine for sizing and coring pineapples and similar fruits, said machine comprising a frame, a tubular sizing cutter rotatably mounted on said frame, a movable feeding device for said sizing cutter, said device comprising means to push said fruits towards said sizing cutter and in alignment therewith, said pushing means comprising releasable push plates linked on an endless chain and adapted for driving contact with the bottom of the pineapples, a nonrotating tubular coring cutter movably mounted along said frame, coaxially to said sizing cutter and adapted to penetrate into said latter cutter, means fitted on said coring cutter to keep the fruit from turning by engagement therewith while being sized, said latter means comprising a fruit pricker slidably mounted onto said coring tubular cutter, means to rotate said sizing cutter, driving means to reciprocate said coring cutter with respect to said sizing cutter, and means to synchronize the motion of said coring cutter with that of said means to push said fruits towards said sizing cutter so that each of said fruits is penetrated by said coring cutter while being pushed in the opposite direction onto said sizing cutter by said pushing means, so far as to substantially meet said push plate, said synchronizing means further being such that said coring cutter is thereafter reciprocated into the opposite direction whereas said push plate is released from contact with the bottom of the fruit.

9. Machine for sizing and coring pineapples and similar fruits, said machine comprising a frame, a tubular sizing cutter rotatably mounted on said frame, a movable feeding device for said sizing cutter, said device comprising means to push said fruits towards said sizing cutter, a nonrotating tubular coring cutter movably mounted along said frame, coaxially to said sizing cutter and adapted to penetrate into said latter cutter, means fitted on said coring cutter to keep the fruit from turning by engagement therewith while being sized, said latter means comprising a fruit picker slidably mounted onto said coring tubular cutter, means to rotate said sizing cutter, driving means to reciprocate said coring cutter with respect to said sizing cutter, means to synchronize the motion of said coring cutter with that of said means to push said fruits towards said sizing cutter so that each of said fruits is penetrated by said coring cutter while being pushed in the opposite direction onto said sizing cutter by said pushing means, and means borne by said frame to deliver the fruit as sized and cored by said sizing cutter and coring cutter while still having its skin attached to the head and bottom thereof.

References Cited by the Examiner
UNITED STATES PATENTS

| | | |
|---|---|---|
| 293,940 | 2/1884 | Brock. |
| 1,065,455 | 6/1913 | Lister _____ 146—6 |
| 3,073,366 | 1/1963 | Sawyer et al. _____ 146—6 |

ROBERT C. RIORDON, *Primary Examiner.*

J. SPENCER OVERHOLSER, *Examiner.*